(12) United States Patent
Bangerter et al.

(10) Patent No.: US 8,312,271 B2
(45) Date of Patent: Nov. 13, 2012

(54) PRIVACY-PROTECTING INTEGRITY ATTESTATION OF A COMPUTING PLATFORM

(75) Inventors: Endre Bangerter, Nidau (CH); Matthias Schunter, Zurich (CH); Michael Waidner, Au (CH); Jan Camenisch, Rueschlikon (CH)

(73) Assignee: International Business Machines Corporation, Armonk, NY (US)

( * ) Notice: Subject to any disclaimer, the term of this patent is extended or adjusted under 35 U.S.C. 154(b) by 425 days.

(21) Appl. No.: 12/126,978

(22) Filed: May 26, 2008

(65) Prior Publication Data

US 2008/0229097 A1     Sep. 18, 2008

Related U.S. Application Data

(63) Continuation of application No. 11/178,722, filed on Jul. 11, 2005, now abandoned.

(30) Foreign Application Priority Data

Jul. 12, 2004 (EP) ..................................... 04405442

(51) Int. Cl.
*H04L 29/06* (2006.01)
(52) U.S. Cl. ........ 713/168; 713/155; 713/176; 713/182; 726/18; 726/19
(58) Field of Classification Search .................. 713/155, 713/158, 164, 168, 176, 182, 187; 726/18, 726/19; 709/227, 228
See application file for complete search history.

(56) References Cited

U.S. PATENT DOCUMENTS

| | | | |
|---|---|---|---|
| 5,633,929 A | 5/1997 | Kaliski et al. | |
| 7,509,644 B2 | 3/2009 | Worley, Jr. | |
| 2003/0074548 A1 | 4/2003 | Cromer et al. | |
| 2004/0064457 A1 | 4/2004 | Zimmer et al. | |
| 2004/0103281 A1 | 5/2004 | Brickell | |
| 2005/0021968 A1* | 1/2005 | Zimmer et al. | 713/176 |
| 2005/0138384 A1 | 6/2005 | Brickell | |
| 2005/0216736 A1* | 9/2005 | Smith | 713/168 |
| 2005/0289347 A1* | 12/2005 | Ovadia | 713/171 |
| 2007/0226505 A1 | 9/2007 | Brickell | |
| 2007/0256125 A1* | 11/2007 | Chen et al. | 726/18 |
| 2008/0229097 A1 | 9/2008 | Bangerter et al. | |

OTHER PUBLICATIONS

Schneier, B., Applied Cryptography, Second Edition: protocols, algorithms, and source code in C, New York, John Wiley & Sons, Oct. 18, 1995, § 2.4, p. 30-31.*

(Continued)

*Primary Examiner* — Justin T Darrow
(74) *Attorney, Agent, or Firm* — Law Offices of Ira D. Blecker, P.C.

(57) ABSTRACT

Systems, apparatus and methods for privacy-protecting integrity attestation of a computing platform. An example method for privacy-protecting integrity attestation of a computing platform (P) has a trusted platform module (TPM), and comprises the following steps. First, the computing platform (P) receives configuration values (PCR1 . . . PCRn). Then, by means of the trusted platform module (TPM), a configuration value (PCRp) is determined which depends on the configuration of the computing platform (P). In a further step the configuration value (PCRp) is signed by means of the trusted platform module. Finally, in the event that the configuration value (PCRp) is one of the received configuration values (PCR1 . . . PCRn), the computing platform (P) proves to a verifier (V) that it knows the signature (sign(PCRp)) on one of the received configuration values (PCR1 . . . PCRn).

9 Claims, 2 Drawing Sheets

OTHER PUBLICATIONS

Louis Claude Guillou, Jean-Jacques Quisquater, "A 'Paradoxical' Identity-Based Signature Scheme Resulting from Zero-Knowledge", 1998. Provided by the Office in the parent case.

Bennet Yee, "Using Secure Coprocessors", May 94, School of Computer Science, Carnegie Mellon University. Provided by the Office in the parent case.

Prosecution History for European counterpart application of U.S. Appl. No. 12/126,978.

* cited by examiner

PRIVACY-PROTECTING INTEGRITY ATTESTATION OF A COMPUTING PLATFORM

This application is a continuation of prior application 11/178,722, filed Jul. 11, 2005, now abandoned.

TECHNICAL FIELD

The present invention relates to a method for privacy-protecting integrity attestation of a computing platform, a computing platform for privacy-protecting integrity attestation, and a network for privacy-protecting communication.

BACKGROUND OF THE INVENTION

Processing critical information relies on the security of the computing platform. Typical security goals are to prevent such critical information from leaking beyond the realm of machines that are trusted by the user or to prevent corrupted machines from impacting the integrity of a computation. External verification of platform integrity enables a machine to verify that another machine meets certain security requirements. This is useful, for example, when a grid server wants to assure that a grid node is untampered before delegating a grid process to it.

In the following example two computers or machines A and B interact over a network. In the example machine A can make certain statements about its own state, e.g. "I am in status access" or "My software . . . is in status x", or deliver a hash or checksum of this status (h(x)), or certain properties, e.g. "I am running version . . . of Linux". Machine A can send these statements to machine B, but why should machine B trust machine A with respect to the correctness of these statements? If machine A is corrupted by a hacker, it could make arbitrary claims about itself.

Therefore, it is desired to implement a proving method with which machine B can verify whether the statements made by machine A are correct. The embodiment of such a proving method is shown in FIG. 1. In the following, machine A is called verified machine or the prover and machine B the verifier. All solutions to this problem assume that there is a piece of hardware, called trusted platform module TPM, which cannot be compromised, and which can make reliable statements about the rest of the system A. Specifically, the industry consortium Trusted Computing Group (TCG) has specified the trusted platform module TPM, which can compute a checksum of the system configuration of machine A, wherein the checksum can be computed for a system configuration in which all or only a part of the software is running on machine A. In a further step the computed checksum is signed, and afterwards send off to the verifier B. The corresponding protocol is shown in FIG. 2.

The Trusted Computing Group is an IT industry consortium which has developed a specification of a small, low-cost commodity hardware module, called trusted platform module (TPM). The TPM can serve as a root of trust in remote (and local) platform verification. The base TCG model of this configuration verification process, called binary attestation, aims at measuring all executed code. Therefore, each measured piece of software stores metrics of a sub-component into the TPM before executing it, wherein the metrics are hash values of the configuration's components. The metrics are bootstrapped by the basic input output system (BIOS) that is trusted by default and that is measuring and storing the boot loader. The chain of trust can then be extended to the operating system components and to the applications and their configuration files. Once the executables are measured into the TPM, the TPM can reliably attest to the metrics of the executed components by signing the metrics with a TPM-protected key. The signed metrics, also called integrity metrics, can then be transmitted to a verifying machine. This verifier machine, or in short verifier, can decide whether to consider the verified machine trustworthy enough to involve it in a subsequent computation. As will be elaborated hereinafter, this straightforward approach of binary attestation lacks privacy. The main reason therefore is that the whole configuration is transmitted.

Hereinafter, the binary attestation and verification is explained. The ability of the TPM reliably to report on the verified platform's computing environment follows from the TPM-enabled measurement and reporting. The description in the following paragraphs focuses on a PC-platform. Nevertheless, the TPM can be implemented in any platform or computing device, e.g. mobile phone, PDA, notebook, etc. The measurement and storage of integrity metrics is started by the BIOS boot block (a special part of the BIOS which is believed to be untampered) measuring itself and storing the measurements in a TPM PCR (platform configuration register) before passing control to the BIOS. In the same way, the BIOS then measures option ROMs and the boot loader and records these measurements in a TPM PCR before passing control to the boot loader. The process continues as the boot loader measures and stores integrity metrics of the operating system (OS) before executing it. The OS in turn measures and stores integrity metrics of additionally loaded OS components before they are executed. If support by the OS is provided, applications can also be measured before being executed. The measurement and reporting processes are depicted in a simplified manner in FIG. 2, in which H represents the cryptographic hash function SHA-1. During initialization, various platform configuration registers PCRx as well as a configuration log file log (stored on the platform) are initialized. This log file log keeps track of additional information such as descriptions or file paths of loaded components. Its integrity needs not to be explicitly protected by the TPM. During subsequent measurement of components, this log file log is extended, while metrics (hash values) of the executables are stored in the TPM using the tpm_extend method replacing the contents of the appropriate platform configuration register PCRx with the hash of the old contents and the new metrics, wherein metrics of loaded components are reliably stored in the TPM. When a remote verifier B wants to assess the security of the verified platform A, the verifier B sends a challenge c to the platform A. The platform A uses this challenge c to query with a tpm_quote command the TPM for the value of the platform configuration registers PCR. The TPM responds with a signed message qu=sign$_{AIK}$($\overrightarrow{PCR}$, c) containing the PCR values and the challenge c. The platform A returns this signed quote qu to the challenger (verifier B) together with information from the log file log needed by the verifier B to reconstruct the verified platform's configuration. The verifier B can then decide whether this configuration is acceptable. The key used for signing the quote is an attestation identity key AIK of the TPM. As a TPM may have multiple attestation identity keys, the key or its identifier has to be specified in the tpm_quote request. An attestation identity key AIK is bound to a specific TPM. Its public part is certified in an attestation identity key certificate by a privacy-certification authority as belonging to a valid TPM. The verifier of a quote signed with a correctly certified AIK believes that the quote was produced by a valid TPM, more specifically, by the unique TPM owning that AIK. This belief is based on the assumption that the TPM is not easily subject to hardware attacks and that effective revocation mechanisms are in place dealing with compromised keys.

Note that the above measurement process does not prohibit execution of untrusted code, it only guarantees that the measurement of such code will be securely stored in the TPM. Thus, if malicious code is executed, the integrity of the platform A may be destroyed. However, the presence of an untrusted or simply unknown component will be reflected by the TPM quotes not matching the correct or expected values.

Further information about the Trusted Computing Group and the trusted platform module can be found in The Trusted Computing Group, Main specification version 1.1b, 2003, which is available from http://www.trustedcomputing-group.org.

The trusted platform module TPM also supports trusted booting, which means that the prover A can go through a sequence of steps. In each step a new component is loaded e.g., first the boot loader, then the operating system, and then an application. The TPM ensures that each step succeeds only if all previous steps succeeded. Via trusted booting one can ensure that the prover A boots into a known, well-defined state, with certain properties.

A related, theoretically well investigated feature is secure booting. The difference to trusted booting is that a system with secure booting either boots a specific, pre-defined system or does not boot at all, while a system with trusted booting can boot any system, but certain data are accessible only if it boots into a pre-defined system. The details of how a secure boot process can be carried out can be looked up in B. Yee, "Using secure coprocessors", Technical Report CMU-CS-94-149, Carnegie Mellon University School of Computer Science, May 1994.

The above mentioned TCG specifications define mechanisms for a TPM-enabled platform to reliably report its current hardware and software configuration to a local or remote challenger. This binary attestation, based on measurements of binary executables, firstly requires that the platform builds a chain of trust from the hardware up to the operating system and potentially, including applications by measuring integrity metrics of modules and storing them in the TPM, and secondly requires that the TPM is able to report on these integrity metrics in an authenticated way. A verifier obtaining such authenticated integrity metrics can then match them against the values of a known configuration and decide whether the verified machine meets the security requirements or not. But with that, the privacy of the verified machine is violated, because with this approach the prover needs to reveal its configuration. The verifier gets information about the configuration of the verified machine, e.g. which operating system and which applications are running on the verified machine. This will not be acceptable to consumer since it raises substantial privacy concerns.

SUMMARY OF THE INVENTION

Therefore, an aspect of the invention is to provide methods, apparatus and systems for privacy-protecting attestation of a computing platform, where the computing platform can keep its configuration secret. That is the computing platform does not have to reveal its configuration.

Thus, according to one embodiment of the invention, the aspect is achieved by a method for privacy-protecting integrity attestation of a computing platform with the features described. A method for privacy-protecting integrity attestation of a computing platform having a trusted platform module comprises the following steps. First, the computing platform receives configuration values. Then, by means of the trusted platform module a configuration value is determined which depends on the configuration of the computing platform. In a further step the configuration value is signed by means of the trusted platform module. Finally, in the event that the configuration value is one of the received configuration values, the computing platform proves to a verifier that it knows the signature on one of the received configuration values.

According to another aspect of the invention, an embodiment provides a computing platform for privacy-protecting integrity attestation. A computing platform for privacy-protecting integrity attestation according to the invention is formed such that it is able to receive configuration values and comprises a trusted platform module which in turn is formed such that it is able to determine a configuration value depending on the configuration of the computing platform, and to sign the configuration value. Furthermore, the computing platform is formed such that in the event that the configuration value is one of the received configuration values it is able to prove to a verifier that it knows the signature on one of the received configuration values.

According to a further aspect of the invention, an embodiment provides a network for privacy-protecting communication.

The present invention also provides a computer program element comprising program code for performing an above described method when loaded in a digital processor of a computer. The present invention also provides a computer program product stored on a computer usable medium, comprising computer readable program code for causing a computer to perform the above described method.

Additional aspects and advantages of the invention will be set forth in the description which follows, and in part will be obtained from the description, or may be learned by practice of the invention.

BRIEF DESCRIPTION OF THE DRAWINGS

The invention and its embodiments will be more fully appreciated by reference to the following detailed description of presently preferred but nonetheless illustrative embodiments in accordance with the present invention when taken in conjunction with the accompanying drawings, in which.

REFERENCE SIGNS

Figure 1:
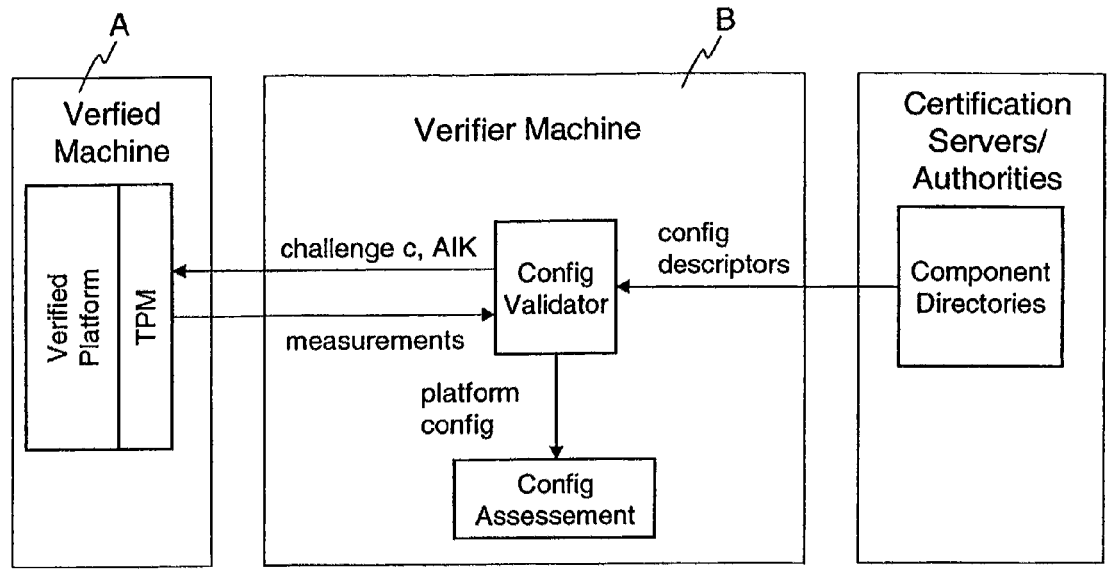
FIG. 1 shows a block diagram of the architecture for a system for binary attestation according to the prior art.

A verified machine according to the prior art
B verifier machine according to the prior art
PCR1 . . . PCRn configuration values
PCRp configuration value of the computing platform
P prover or computing platform
V verifier
sign(PCRp) signature on the configuration value PCRp

DETAILED DESCRIPTION OF THE INVENTION

The present invention provides systems, apparatus and methods for privacy-protecting attestation of a computing platform, where the computing platform can keep its configuration secret, such that the computing platform does not have to reveal its configuration. An example embodiment of the invention, provides a method for privacy-protecting integrity attestation of a computing platform. A method for privacy-protecting integrity attestation of a computing platform has a trusted platform module including the following steps. First, the computing platform receives configuration values. Then, by means of the trusted platform module a configuration value is determined which depends on the configuration of the computing platform. In a further step the configuration value is signed by means of the trusted platform module. Finally, in the event that the configuration value is one of the received configuration values, the computing platform proves to a verifier that it knows the signature on one of the received configuration values.

A further embodiment of the invention provides a computing platform for privacy-protecting integrity attestation. The computing platform for privacy-protecting integrity attestation according to the invention is formed such that it is able to receive configuration values and includes a trusted platform module, which in turn is formed such that it is able to determine a configuration value depending on the configuration of the computing platform, and to sign the configuration value. Furthermore, the computing platform is formed such that in the event that the configuration value is one of the received configuration values it is able to prove to a verifier that it knows the signature on one of the received configuration values.

A still further embodiment of the invention provides a network for privacy-protecting communication. An example of a network for privacy-protecting communication according to the invention includes a verifier, and a computing platform having a trusted platform module, wherein the computing platform is formed such that it is able to receive configuration values, e.g. from the verifier. The trusted platform module is formed such that it is able to determine a configuration value depending on the configuration of the computing platform, and to sign the configuration value. The computing platform is furthermore formed such that in the event that the configuration value is one of the received configuration values it is able to prove to the verifier that it knows the signature on one of the received configuration values.

Advantageous further developments of the invention arise from the characteristics indicated in this description. Preferably, in the method according to the invention the proof is carried out by a cryptographic proof. Advantageously, in a method according to the invention the proof is carried out by a zero-knowledge proof. With that, it can be ensured that the information the verifier gets from the computing platform does not contain any knowledge about the configuration of the computing platform itself.

In an example embodiment of the method according to the invention the computing platform checks after receiving the configuration values whether configurations having the received configuration values actually may exist, and if this is the case the above described method is further processed. In this manner, the privacy-protection can be further improved.

In another embodiment of the method according to the invention the computing platform checks whether the number of received configuration values exceeds a minimum number of configuration values, and if this is the case the above described method is further processed. In this way, the privacy-protection can be further improved.

Figure 2:
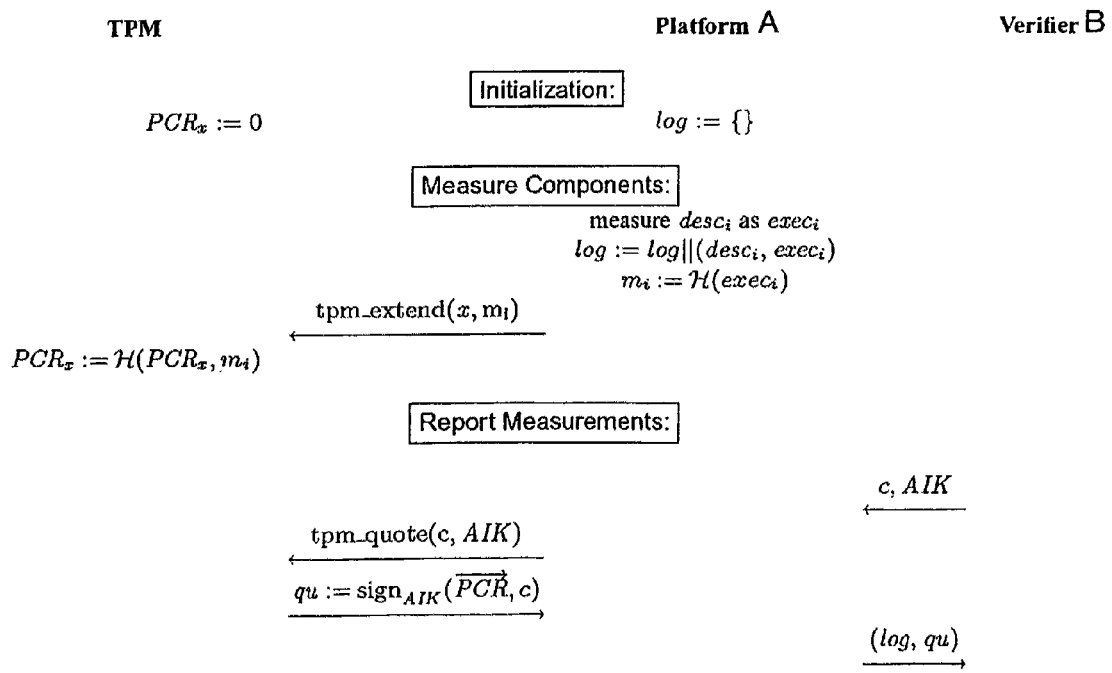
FIG. 2 shows a protocol for the architecture shown in FIG. 1.

The present invention also provides a computer program element embodiment comprising program code for performing the above described method when loaded in a digital processor of a computer. The present invention also provides a computer program product embodiment. A computer program product is stored on a computer usable medium, comprising computer readable program code for causing a computer to perform an above described method. Additional aspects and advantages of the invention will be set forth in the description which follows, and in part will be obvious from the description, or may be learned by practice of the invention. A description of the FIGS. 1 and 2 was given above.

A way to implement privacy-friendly attestation where the prover and the verifier ensure that the prover has one of the given configurations without revealing which one is described below. As a consequence, the verifier learns nothing except that the prover has a correct or permissible configuration. This enhances the privacy of the prover substantially.

Figure 3:
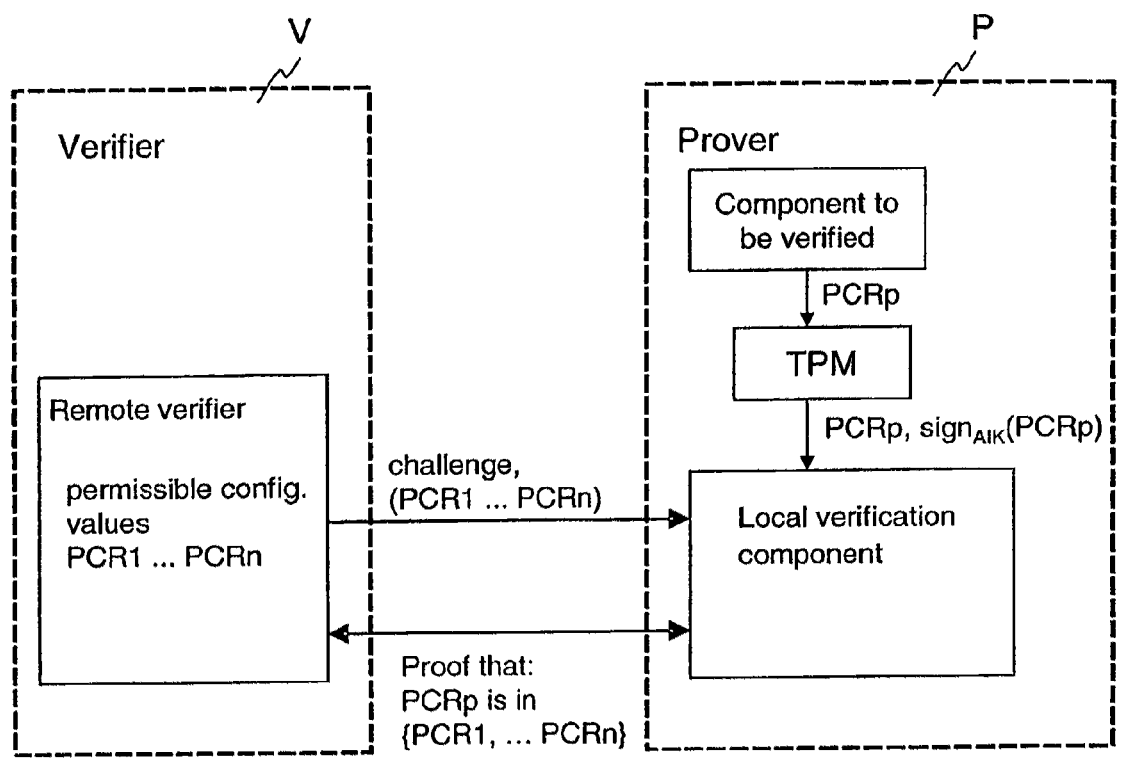
FIG. 3 shows a block diagram of the architecture for a system for privacy-protecting attestation of the integrity of a computing platform according to the invention.

In FIG. 3 a block diagram of the architecture for a system for privacy-protecting attestation of the integrity of a computing platform according to the invention is depicted. A computing platform P, in the following also called platform or prover, comprises a trusted platform module TPM that measures the platform P. This measurement results in a platform configuration register value stored in a platform configuration register (PCR). Different PCR values correspond to different configurations of the platform P. To convince the verifier V that the platform P is in a certain configuration, the TPM signs the measured PCR value PCRp with respect to an attestation identity key AIK which comprises an RSA public/secret key pair. Afterwards, the TPM sends the PCR value PCRp and its signature $sign_{AIK}(PCRp)$ to the local verification component, which is a part of the platform P. It receives the PCR value PCRp and its signature $sign_{AIK}(PCRp)$ and then runs the protocol below. That is, the platform P is given the PCR value, the RSA signature on the PCR value, and the RSA public key part of the attestation identity key AIK. The platform P wants to produce from this a proof that it knows an RSA signature with respect to this attestation identity key AIK on, e.g., one out of a list of PCR values. In the following it is described how this can be achieved.

By using a cryptographic proof, particularly a zero-knowledge proof, the prover P can prove its integrity to the verifier without revealing its configuration. This means, the prover P can proof to the verifier V by means of the cryptographic proof that its configuration is indeed one of the configurations the verifier V has specified as being correct or permissible.

The protocol described below uses techniques devised by Louis C. Guillou and Jean-Jacques Quisquater, "A "paradoxical" identity-based signature scheme resulting from zero-knowledge" in Shafi Goldwasser, editor, Advances in Cryptology—CRYPTO '88, volume 403 of LNCS, pages 216-231, Springer Verlag, 1988, Ronald Cramer, Ivan Damgård, and Berry Schoenmakers "Proofs of partial knowledge and simplified design of witness hiding protocols" in Yvo G. Desmedt, editor, Advances in Cryptology—CRYPTO '94, volume 839, pages 174-187, Springer Verlag, 1994, and Alfredo De Santis, Giovanni Di Crescenzo, Giuseppe Persiano, and Moti Yung "On monotone formula closure of SZK" in 35th Annual Symposium on Foundations of Computer Science, pages 454-465, Santa Fe, N. Mex., 20-22 Nov. 1994, IEEE. In the following key notions are briefly recalled and some notations used are described. For details reference is made to the above mentioned papers.

Let $\theta$ denote a smooth secret sharing scheme and s a secret that is shared among n participants, each having an element of the set of secret shares $\{s_1, \ldots, s_n\}$. A qualified set of secret shares for $\theta$ is a set of shares that allows to reconstruct s. The access structure $\Gamma$ is the set of index sets that contain the indices of secret shares being qualified sets.

The dual access structure to the access structure $\Gamma$ is denoted by $\Gamma^*$ and defined by:

$$A \in \Gamma^* \Leftrightarrow \overline{A} \notin \Gamma$$

By definition of a smooth secret sharing scheme $\theta$ there exist algorithms as follows:

A first algorithm is called "is-consistent (s, $\{s_1, \ldots, s_n\}$, $\Gamma$)", whereas the first argument s of the algorithm is a secret, the second argument $\{s_1, \ldots, s_n\}$ is a full set of secret shares, and the third argument $\Gamma$ is an access structure. The algorithm is-consistent (s, $\{s_1, \ldots, s_n\}$, $\Gamma$) returns 1, if all qualified sets in $\Gamma$ determine s as the secret. Such a triple (s, $\{s_1, \ldots, s_n\}$, $\Gamma$) is called consistent. Otherwise the algorithm returns $\{\}$.

A second algorithm is called "complete (s, $\{s_1, s_k\}$, $\Gamma$)", whereas the first argument s of the algorithm is a secret, the second argument $\{s_1, \ldots, s_k\}$ is a set of incomplete shares, i.e., a not qualified set of shares, and the third argument $\Gamma$ is an access structure. The algorithm complete (s, $\{s_1, \ldots, s_k\}$, $\Gamma$) returns a set of shares S such that $S \cup \{s_1, \ldots, s_k\}$ is consistent, whereas $\{s_1, \ldots, s_k\} \cap S = \{\}$.

This general technique allows one to prove arbitrary statements, for instance "I know a signature on PCR1 and PCR2 or one on PCR2 and PCR3 or one on PCR4." In practice, however, the statement will often be "I know a signature on one out of the following PCR1, PCR2, PCR3, and PCR4." In this case, the secret sharing scheme $\theta$ can be realized quite simply: If the secret s is a secret k-bit string, choose k−1 shares $s_i$ as random k-bit strings and then set the share $s_k$ to:

$$s_k = s \oplus (\bigoplus_{i=1}^{k-1} s_i) = s \oplus s_1 \oplus s_2 \oplus \ldots s_{k-1}$$

wherein $\oplus$ denotes a XOR-operation.

That is, the algorithm is-consistent (s, $\{s_1, \ldots, s_n\}$, $\Gamma$) checks whether the secret s holds the condition:

$$s = \oplus_{i=1}^{k} s_i$$

The algorithm complete (s, $\{s_1, \ldots, s_{j-1}, s_{j+1}, s_k\}$, $\Gamma$) sets the share $s_j$ to:

$$s_j = s \oplus (\oplus_{i=1, i \neq j}^{k} s_i).$$

In the following is described how the knowledge of a RSA signature can be proved.

Let m be the message that is signed, $\sigma$ the signature on the message m, and (e, n) the public key of the signer, wherein the signer is for example the TPM and in the context of TCG the exponent $e = 2^{16} - 1$. Let H be the encoding function as defined in PKCS#1 V1.5 (RSA Encryption Standard, http://www.rsasecurity.com/rsalabs/node.asp?id=2125). The value $\sigma$ is a valid signature on the message m if $\sigma^e = H(m) \pmod{n}$ with respect to the public key (e, n).

Considering now a zero knowledge protocol that allows the prover P to convince the verifier V that it knows a signature $\sigma$ on a message m with respect to the public key (e, n) where the verifier V is allowed to learn the message m and the public key (e, n) but not the signature $\sigma$.

It is assumed that the zero knowledge protocols run in practice in non-interactive mode. That is, one can use the Fiat-Shamir heuristic with the protocols. The Fiat-Shamir heuristic is described in Amos Fiat and Adi Shamir "How to prove yourself: Practical solutions to identification and signature problems" in Andrew M. Odlyzko, editor, Advances in Cryptology—CRYPTO '86, volume 263 of LNCS, pages 186-194, Springer Verlag, 1987. In this mode, the challenge c in the protocol is determined via a hash-function on the first message t in the protocol and the protocol's public inputs.

One way to achieve the required proof is to apply the protocol by Louis C. Guillou and Jean-Jacques Quisquater, "A "paradoxical" identity-based signature scheme resulting from zero-knowledge" in Shafi Goldwasser, editor, Advances in Cryptology—CRYPTO '88, volume 403 of LNCS, pages 216-231, Springer Verlag, 1988. It works as follows:
1. The prover P carries out the following steps:
   The prover P chooses a random value r, wherein $r \in Z^*_N$, sets the first message t to:

$t = r^e \bmod N$, and sends the first message t to the verifier V.
2. Afterwards, the verifier V carries out the following steps:
   The verifier V chooses a random value c, wherein $c \in_U [0, e-1]$, and sends the random value c to the prover P.
3. Afterwards, the prover P carries out the following steps:
   The prover P computes the response value $res = r \cdot \sigma^c \bmod N$, and sends the response value res to the verifier V.
4. Finally, the verifier V carries out the following step:
   The verifier V outputs the value of the predicate $res^e \stackrel{?}{=} t(H(m))^c \bmod N$ This protocol provides a security assurance of 1/e which is about $2^{-16}$ in the TCG case. If the protocol is run interactive, one should repeat it at least 4 times. If the protocol is run in non-interactive mode, i.e., when a hash function/Fiat-Shamir heuristic is applied to compute the challenge, one should run the protocol about 10 times.

Specification of a privacy friendly attestation protocol

It is denoted the set T of publicly known PCR values that are considered correct by $T \doteq \{PCR1, \ldots, PCRn\}$. The prover's AIK signing-/verification-key pair is denoted by $(S_{AIK}, V_{AIK})$. The signature $\sigma$ on the message m is $\sigma \doteq \text{sign}(S_{AIK}, m)$, which can be verified by evaluating the predicate $\text{verify}(V_{AIK}, \sigma)$. More precisely, the verification key $V_{AIK}$ consists of the integers (N, e) where N is a RSA modulus and e is a prime exponent.

Let $A_V \doteq \{i_1, \ldots, i_m\}$ the set of indices of the PCR values for which the prover P knows a signature. That is, the prover P knows a set of signatures S:

$$S \doteq \{\sigma i_1 \doteq \text{sign}(S_{AIK}, PCR i_1), \ldots, \sigma_{im} \doteq \text{sign}(S_{AIK}, PCR i_m)\}$$

It is $A_V$ an index set, and $A_1, \ldots, A_k \subset \{1, \ldots, n\}$ arbitrary index sets. It is noted that for the PCR values described by the index sets $A_1, \ldots, A_k$ the prover P does not need to know the corresponding signatures. Finally G denotes the set of index sets $\{A_V, A_1, \ldots, A_k\}$.

The above described privacy friendly attestation protocol allows the prover P to assert to the verifier V that it knows signatures on the PCR values described by one of the index sets $\{A_V, A_1, \ldots, A_k\}$ in the set G. Thereby the verifier V does not get any information for which of the index sets $\{A_V, A_1, \ldots, A_k\}$ in the set G the prover P knows the signature or signatures $\sigma$.

In the following a protocol for implementing the invention is described. Common inputs to the prover P, and the verifier V are: $C \doteq \{0, \ldots, c^+\}$, the set of public known correct PCR values T, the set G, and the verification key $V_{AIK}$. Private inputs to the prover P are: the set of signatures S, and the index set $A_V$. The joint computation of the prover P, and the verifier V is as follows.
1. The prover P carries out the following steps:
   a) The prover P chooses for each $j \in A_V$ a random value $r_j$ wherein $r_j \in Z^*_N$, and sets the value $t_j$ to:

$t_j \doteq r_j^e \bmod N$.

b) The prover P chooses for $j \in \overline{A}_V$ a response value $res_j \in_U Z^*_N$, $c \in_U C$, and sets the value $t_j$ to:

$$t_j \doteq res_j^e (H(PCRj))^{-c} \bmod N$$

It is noted that the index set $\overline{A}_V$ is the complement of the index set $A_V$ in $\{1, \ldots, n\}$.

c) The prover P sends the messages $(t_1, \ldots, t_n)$ to the verifier V.

2. After that, the verifier V carries out the following steps:
The verifier V chooses a random value c wherein $c \in_U C$, and sends the random value c to the prover P.

3. After that, the prover P carries out the following steps:

$$\tilde{C} \doteq \text{complete}(c, \{c_i : i \in \overline{A}_V\}, \Gamma^*).$$

a) The prover P computes for $j \in A_V : c_j \in \tilde{C}$ the response value $res_j \doteq r_j \sigma_j^{c_j} \bmod N$.

b) The prover P sends $((res_1, c_1), \ldots, (res_n, c_n))$ to the verifier V. Remark: For $j \in \overline{A}_V$ the $(res_j, c_j)$ were already computed in the round 1.

4. The verifier V carries out the steps:
The verifier V outputs the value of the following predicate:

$$(\wedge_{j=1, \ldots, n} S_j^e \stackrel{?}{=} t_j (H(PCRi))^{c_j} \bmod N) \text{ is-consistent } (c, \{c_1, \ldots, c_n\}, \Gamma)$$

wherein ∧ denotes an AND-operation.

In the above described protocol the random value c is interpreted as secret and $c_i$ as share of the secret c and the $c_i$ are the challenges in the zero knowledge protocol with which is proofed that a signature on the PCRi value is known.

As mentioned in the previous section, $c^+ < e$ should hold for this proof to work. Also, the secret sharing scheme θ should be compatible with this. In practice, one would run many, e.g., 10 instances of this protocol in parallel and determine c via a hash function of all the first messages, i.e., the tuples $(t_1, \ldots, t_n)$, the involved AIK and all the PCR values. More precisely, the one would concatenate for each i the $c_i$ (about 16 bits each) from all the protocol instances, to obtain a larger $\hat{c}_i$ (about 160 bits), then use the hash function to determine $\hat{c}_i$, (e.g., 160 bits), use the secret sharing scheme to obtain the remaining $\hat{c}_i$, (e.g., 160 bits), split then into smaller parts (e.g., 16 bits) and use each of these small parts with on the parallel protocol instance.

Which configuration values are permissible configuration values is defined by the verifier V. For example, the verifier V can mark a configuration value as not permissible if the corresponding configuration does not fulfill the desired security properties.

Abuse might arise if a configuration value is indicated as permissible by the verifier V but does not represent a possible configuration. If the verifier V transmits such improper configuration or dummy values together with a proper configuration value PCRs actually representing a possible configuration to the prover P the verifier V might spy out the actual configuration of the prover P. Because the set of transmitted configuration values comprises mainly dummy values, the prover P can only prove to the verifier V that its configuration is the configuration corresponding to the configuration value PCRs and with that the verifier V knows the actual configuration of the prover P. If the prover P cannot prove that its configuration is in the set of transmitted configuration values, i.e. its configuration does not correspond to the configuration value PCRs, the verifier V can transmit a further slightly modified set of configuration values to the prover P and repeat the procedure until it has found out the actual configuration of the prover P. To prevent this kind of abuse the method according to the invention can comprise the following step. After the prover P has received the permissible configuration values PCR1 . . . PCRn the prover P checks whether configurations having the configuration values PCR1 . . . PCRn actually may exist, and if this is the case the integrity proof is processed. Otherwise the prover P can for example abort the proof or ask the verifier V for a new set of configuration values.

A similar abuse by the verifier V may occur if the verifier V transmits only a very small number of configuration values to the prover P. Also in this case the verifier V has the possibility to spy out the actual configuration of the prover. If for example the verifier V transmits only one configuration value to the prover P, the prover P can only prove whether its configuration corresponds to transmitted configuration value or not. In the case the configuration of the prover P corresponds to the transmitted configuration value the prover P proves this to the verifier V and with that the verifier V has learned the configuration of the prover. To avoid this, the prover P can check whether the number of transmitted configuration values does not fall under a minimum number of transmitted configuration values. If the number of transmitted configuration values exceeds the necessary minimum number the integrity proof is processed. Otherwise the prover P can for example abort the proof or ask the verifier V for a bigger set of configuration values.

Thus the invention includes a method comprising privacy-protecting integrity attestation of a computing platform having a trusted platform module, the step of privacy-protecting comprising: receiving a plurality of configuration values, determining by means of the trusted platform module a particular configuration value depending on the configuration of the computing platform, signing by means of the trusted platform module the particular configuration value with a signature, and in the event that the particular configuration value is one of the plurality of configuration values, the computing platform proving to a verifier that it knows the signature on one of the plurality of configuration values.

In some embodiments, the proof is carried out by a cryptographic proof and/or by a zero-knowledge proof.

In some embodiments, the method includes the step after receiving the plurality of configuration values the computing platform checking whether configurations having the configuration values of the plurality of configuration values actually may exist, and terminating the method if at least one configuration value may not exist; and/or the computing platform checking whether the number of received configuration values in the plurality of configuration values exceeds a minimum number of configuration values, and terminating the method if the number of received configuration values does not exceed the minimum number.

In some embodiments, the method includes a computer program comprising program code for performing the steps of the method according to claim 1, when loaded in a digital processor of a computer.

In some embodiments, the method a computer program product is stored on a computer usable medium, comprising computer readable program code for causing a computer to perform the steps of the method.

The invention includes a computing platform for privacy-protecting integrity attestation, the computing platform being adapted to receive a plurality of configuration values, comprising: a trusted platform module adapted to determine a particular configuration value in dependence on the configuration of the computing platform, and to sign the configuration value with a signature, and wherein the computing platform comprises the functionality that in the event that the particular configuration value is one of the received plurality of configuration values the computing platform is adapted to prove to a verifier that it knows the signature on one of the received configuration values.

The invention includes a network for privacy-protecting communication, comprising: a computing platform having a trusted platform module, and a verifier connected to the computing platform, wherein the computing platform is adapted to receive a plurality of configuration values, wherein the trusted platform module is adapted to determine a particular configuration value in dependence on the configuration of the computing platform and to sign the configuration value with a signature, and wherein the computing platform comprises the functionality that in the event that the particular configuration value is one of the received plurality of configuration values the computing platform is adapted to prove to the verifier that it knows the signature on one of the received configuration values.

Variations described for the present invention can be realized in any combination desirable for each particular application. Thus particular limitations, and/or embodiment enhancements described herein, which may have particular advantages to the particular application need not be used for all applications. Also, not all limitations need be implemented in methods, systems and/or apparatus including one or more concepts of the present invention.

The present invention can be realized in hardware, software, or a combination of hardware and software. A visualization tool according to the present invention can be realized in a centralized fashion in one computer system, or in a distributed fashion where different elements are spread across several interconnected computer systems. Any kind of computer system—or other apparatus adapted for carrying out the methods and/or functions described herein—is suitable. A typical combination of hardware and software could be a general purpose computer system with a computer program that, when being loaded and executed, controls the computer system such that it carries out the methods described herein. The present invention can also be embedded in a computer program product, which comprises all the features enabling the implementation of the methods described herein, and which—when loaded in a computer system—is able to carry out these methods.

Computer program means or computer program in the present context include any expression, in any language, code or notation, of a set of instructions intended to cause a system having an information processing capability to perform a particular function either directly or after conversion to another language, code or notation, and/or reproduction in a different material form.

Thus the invention includes an article of manufacture which comprises a computer usable medium having computer readable program code means embodied therein for causing a function described above. The computer readable program code means in the article of manufacture comprises computer readable program code means for causing a computer to effect the steps of a method of this invention. Similarly, the present invention may be implemented as a computer program product comprising a computer usable medium having computer readable program code means embodied therein for causing a function described above. The computer readable program code means in the computer program product comprising computer readable program code means for causing a computer to effect one or more functions of this invention. Furthermore, the present invention may be implemented as a program storage device readable by machine, tangibly embodying a program of instructions executable by the machine to perform method steps for causing one or more functions of this invention.

It is noted that the foregoing has outlined some of the more pertinent objects and embodiments of the present invention. This invention may be used for many applications. Thus, although the description is made for particular arrangements and methods, the intent and concept of the invention is suitable and applicable to other arrangements and applications. It will be clear to those skilled in the art that modifications to the disclosed embodiments can be effected without departing from the spirit and scope of the invention. The described embodiments ought to be construed to be merely illustrative of some of the more prominent features and applications of the invention. Other beneficial results can be realized by applying the disclosed invention in a different manner or modifying the invention in ways known to those familiar with the art.

What is claimed, is:

1. A method of privacy-protecting integrity attestation of a computing platform having a trusted platform module, comprising:
    receiving a plurality of configuration values, wherein a configuration value is a representation of the sum of a internal and external components of computing platform that constitutes a configuration of the computing platform,
    determining by means of the trusted platform module a particular configuration value depending on the configuration of the computing platform,
    signing by means of the trusted platform module the particular configuration value with a signature,
    in an event that the particular configuration value is one of the plurality of configuration values, the computing platform proving to a verifier that it knows the signature on one of the plurality of configuration values without the configuration of the computing platform being revealed to or known by the verifier wherein the method being performed by a computing system; and further comprising the computing platform checking whether the number of received configuration values in the plurality of configuration values exceeds a minimum number of configuration values, and terminating the method if the number of received configuration values does not exceed the minimum number of configuration values.

2. A method according to claim 1, wherein the proof is carried out by a cryptographic proof.

3. A method according to claim 1, wherein the proof is carried out by a zero-knowledge proof.

4. A method according to claim 1, further comprising:
    wherein after receiving the plurality of configuration values the computing platform checking whether configurations having the configuration values of the plurality of configuration values actually may exist, and terminating the method if at least one configuration value may not exist.

5. A method according to claim 1, wherein the proof is carried out by both a cryptographic proof and by a zero-knowledge proof, and the method further comprising:
    after receiving the plurality of configuration values the computing platform checking whether configurations having the configuration values of the plurality of configuration values actually may exist, and terminating the method if at least one configuration value may not exist.

6. A network for privacy-protecting integrity attestation, comprising:
    a computing platform comprising a computer system having a trusted platform module, and a verifier connected to the computing platform,
wherein the computing platform is adapted to receive a plurality of configuration values, wherein a configuration value is a representation of a sum of internal and external components of the computing platform that constitutes a configuration of the computing platform,
wherein the trusted platform module is adapted
to determine a particular configuration value in dependence on the configuration of the computing platform and
to sign the configuration value with a signature, and
wherein the computing platform comprises a functionality that in an event that the particular configuration value is one of the received plurality of configuration values the computing platform is adapted to prove to the verifier that it knows the signature on one of the received configuration values without the configuration of the computing platform being revealed to or known by the verifier wherein the network being performed by a computing system; and further comprising the computing platform comprising a functionality to check whether the number of received configuration values in the plurality of configuration values exceeds a minimum number of configuration values, and to terminate privacy-protecting integrity attestation if the number of received configuration values does not exceed the minimum number of configuration values.

7. The network of claim 6 wherein the configuration value is a representation of the sum of the internal and external components of the computing platform that constitutes a configuration of the computing platform.

8. A program storage device readable by machine, tangibly embodying a program of instructions executable by the machine to perform method steps for privacy-protecting integrity attestation, said method steps comprising:
receiving a plurality of configuration values, wherein a configuration value is a representation of a sum of internal and external components of the computing platform that constitutes a configuration of the computing platform,
determining by means of the trusted platform module a particular configuration value depending on the configuration of the computing platform,
signing by means of the trusted platform module the particular configuration value with a signature,
in an event that the particular configuration value is one of the plurality of configuration values, the computing platform proving to a verifier that it knows the signature on one of the plurality of configuration values without the configuration of the computing platform being revealed to or known by the verifier, the steps of the method being performed by the program storage device; and further comprising the computing platform checking whether the number of received configuration values in the plurality of configuration values exceeds a minimum number of configuration values, and terminating the method if the number of received configuration values does not exceed the minimum number of configuration values.

9. The program storage device of claim 8 further comprising the step:
wherein after receiving the plurality of configuration values the computing platform checking whether configurations having the configuration values of the plurality of configuration values actually may exist, and terminating the method if at least one configuration value may not exist.

* * * * *